Sept. 6, 1949.   H. G. BUSIGNIES   2,480,837
SCANNING DEVICE FOR CATHODE-RAY OSCILLOGRAPHS
Filed Feb. 19, 1943   3 Sheets-Sheet 1
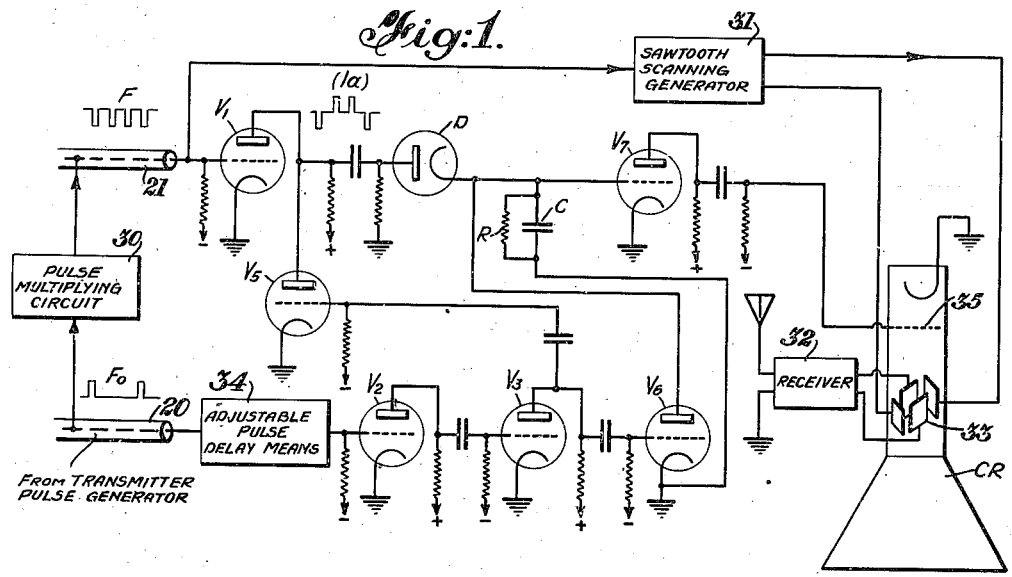
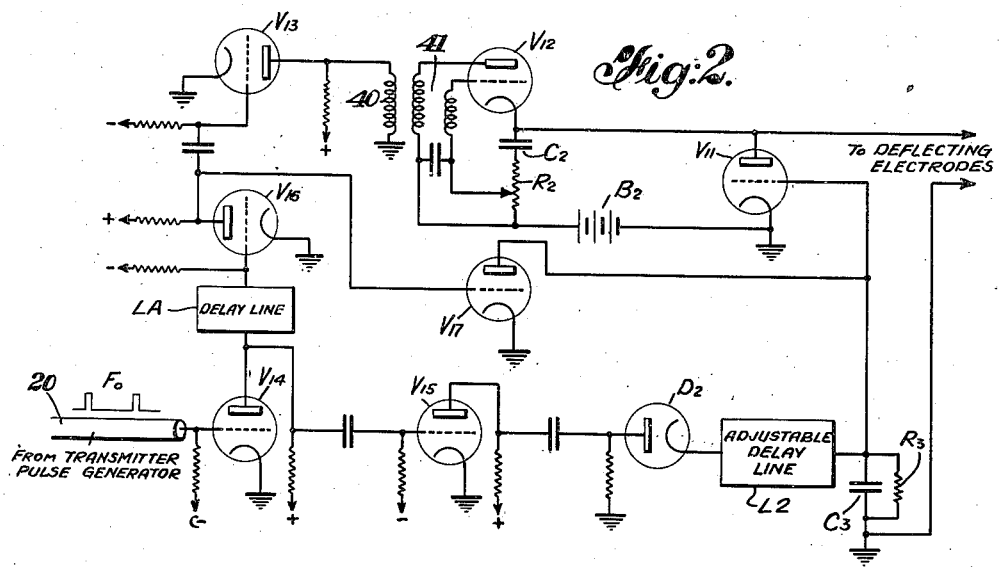
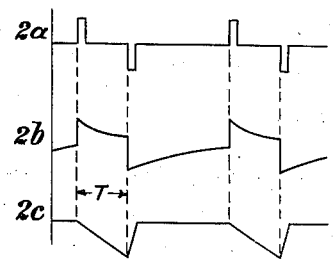
INVENTOR.
HENRI G. BUSIGNIES
BY
E. D. Phinney
ATTORNEY Sept. 6, 1949.                H. G. BUSIGNIES                 2,480,837
               SCANNING DEVICE FOR CATHODE-RAY OSCILLOGRAPHS
Filed Feb. 19, 1943                                   3 Sheets-Sheet 2
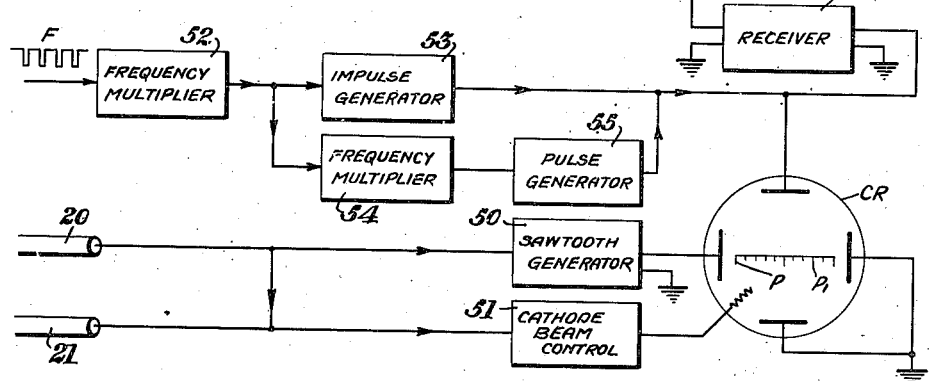
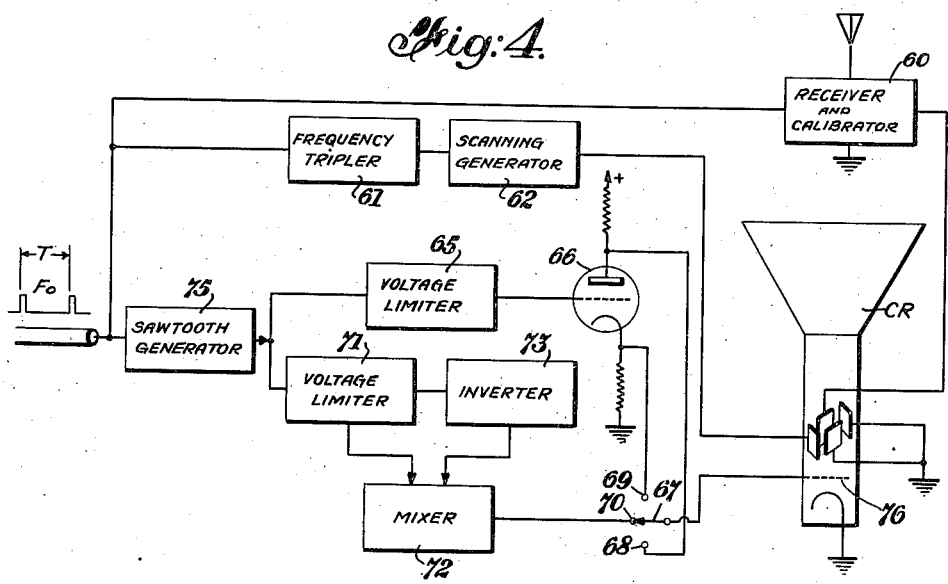
INVENTOR.
HENRI G. BUSIGNIES
BY
ATTORNEY Sept. 6, 1949. H. G. BUSIGNIES 2,480,837
SCANNING DEVICE FOR CATHODE-RAY OSCILLOGRAPHS
Filed Feb. 19, 1943 3 Sheets-Sheet 3
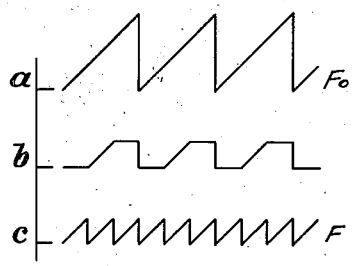
Fig. 5.
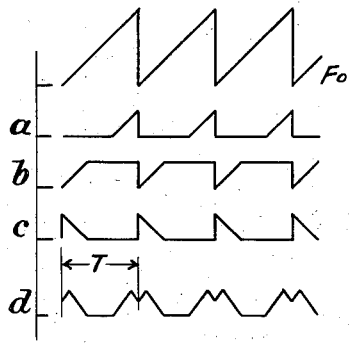
Fig. 6.
Fig. 7.
INVENTOR.
HENRI G. BUSIGNIES
BY
*E. D. Phinney*
ATTORNEY Patented Sept. 6, 1949

2,480,837

UNITED STATES PATENT OFFICE 2,480,837

SCANNING DEVICE FOR CATHODE-RAY OSCILLOGRAPHS

Henri G. Busignies, Forest Hills, N. Y., assignor to International Standard Electric Corporation, New York, N. Y., a corporation of Delaware Application February 19, 1943, Serial No. 476,407
In France March 30, 1940

Section 1, Public Law 690, August 8, 1946
Patent expires March 30, 1960

8 Claims. (Cl. 315—22)

1

This application is a continuation in part of a copending application Serial Number 380,187, filed February 24, 1941, now abandoned.

This invention relates to scanning devices for cathode ray oscillographs and in particular to so-called time base circuits for such oscillographs.

Time base circuits for oscillograph indicators are used to produce sweep waves which control the displacement of the cathode ray beam as a function of time, after which the cathode ray is abruptly returned to the zero position and the displacement is repeated.

According to my invention scanning is provided to cover a part only of the period of phenomena under study. By using only a part of this period an effective magnification of the indicators may be obtained so that the useful part of the indication may be more easily and accurately read.

It is a principal feature of my invention to provide a scanning circuit for a cathode ray oscillograph in which the scanning takes place during a predetermined fraction of the period of the phenomena under test.

It is a further object of my invention to provide a cathode ray oscillograph indicator wherein only a fraction of the period under observation is reproduced on the screen of the tube the remaining fractions being suppressed.

It is a further feature of my invention to provide a system indicating with great precision, by spreading out the deflections representing a fraction of the phenomenon under study to occupy the entire screen of the cathode ray oscillograph which thus acts the part of a vernier with respect to a main oscillograph.

According to a feature of my invention the indicator may be used for the detection of obstacles by observation of reflections or echoes of trains of impulses. In such systems trains of impulses are spaced apart in time in accordance with the distance to be measured and transmitted. The impulses are received after reflection from the objects to be detected and are applied to an oscillograph indicator, the sweep of which is timed with respect to the instant of impulse transmission. The received pulses produce a deflection of the cathode ray beam during the scanning interval. The distance location of the reflecting object may thus be determined by the location of the deflection along the beam scanning trace. By the use of my invention the scanning waves of a sawtooth form may be made to cover the distance representing only a desired portion of the entire distance to be explored.

2

This represented portion, however, covers the entire width of the screen. Use of sawtooth scanning circuit of this type produces several advantages. Only the signals reflected during the time corresponding to the scanned zone or portion appear on the screen of the cathode ray oscillograph to the exclusion of the parasitic signals proceeding from other distantly spaced reflection objects. In addition the scale of the indicator is magnified so that a more precise measurement of the distance to the observed reflecting object can be obtained.

A better understanding of my invention and the objects of the features thereof may be had from the particular description thereof made in reference to the accompanying drawings in which:

Fig. 1 illustrates a circuit in accordance with my invention for producing sawtooth scanning waves;

Fig. 2 illustrates a second embodiment of my invention used for producing the scanning waves;

Fig. 2A is a set of curves used in explaining the operation of the circuit of Fig. 2;

Fig. 3 is a diagram of a receiver in accordance with my invention illustrating a calibrator system therefor;

Fig. 4 is a still further embodiment of my invention showing a still different arrangement for producing the desired scanning effect;

And Figs. 5, 6, and 7 are curves used in explaining the operation of curves in Fig. 4.

In the arrangement shown in Fig. 1 is illustrated an embodiment of my invention using a conventional sawtooth scanning generator circuit in which means is provided for extinguishing or suppressing the spot traced by the oscillograph. According to the arrangement impulse signals $F_0$ are applied over a line 20 from the transmitter impulse generator, not shown. These impulses traverse an impulse multiplying circuit 30 and appear as a train of negative impulses F on line 21. The impulses F are spaced apart and their period is a fraction of the period of the impulses $F_0$ such that there are a completed number of F pulses during a single period of $F_0$.

Impulses F are applied to a sawtooth scanning generator 31 to produce scanning waves at a multiple frequency of $F_0$. A receiver 32 is provided for receiving pulses $F_0$ after reflection and applying them to a set of deflecting plates 33 on a cathode ray oscillograph CR. These plates are arranged at right angles to the deflection plates to which the sawtooth scanning waves are applied. Thus the reflection impulses received at 32 produce lateral deviations of the beam as deflected by the sawtooth generator at a point along the scanning line corresponding to the time of reception or distance of the reflection also. However, the scanning frequency is a multiple of the period of wave $F_0$ and several traces would appear in the period of $F_0$ and confusion would result unless means is provided to suppress all of the scanning waves except that one on which it is desired to make the observations.

To accomplish the suppression the circuit arrangement of Fig. 1 may be used. The impulses $F_0$ are applied over an adjustable pulse delay means 34 to the input grid of a tube V2. The impulses in the output of V2 are of course reversed in phase due to the inherent characteristics of the amplifier and these reversed impulses are applied to the input of V3 where they are again reversed in phase. From the output of tube V3 the amplified impulses are applied to the input of V5 and are reproduced in the output again in phase reversed relationship. The impulses F are passed through tube V1 which causes a phase reversal and the output waves from tube V1 are combined with the output waves from V5 producing a resultant wave $1a$. This resultant wave is applied over a diode D arranged to pass only the positive impulses to the input grid of a tube V7. A time constant circuit R, C is connected in the grid circuit of tube V7 the time constant of this circuit being in the order of 1/F. The positive impulses applied to tube V7 tend to maintain this tube in conductive condition causing the anode circuit to become negative and maintaining a negative bias on the grid 35 of cathode ray tube CR. This negative bias then prevents the beam from impinging on the screen of the tube CR. The impulses $F_0$ from the output of tube V3 are also applied to the input to tube V6 thus appearing in the output of V6 as negative impulses. These negative impulses are applied to the grid of tube V7 blocking this tube. This causes the grid 35 to acquire its positive charge and the cathode ray beam to be passed to the cathode ray screen. Because of the harmonic relationship between F and $F_0$ a line will be traced on the screen during one cycle only of the sawtooth waves from generator 31. Thus only signals which are received on 32 during this brief scanning period will be reproduced on the indicator.

The pulse delay means 34 is preferably adjusted in steps equal to the period of wave F so that any desired fixed fraction of the period of $F_0$ may be produced as a indication on the cathode ray screen. Furthermore if desired the pulses $F_0$ may be applied to receiver 32 to render it inoperative to receive signals during periods when the pulses are transmitted. This feature, however, is not necessary to an understanding of my invention and for this reason is not described in detail here.

In the embodiment of my invention shown in Fig. 2 a circuit is devised to generate a sawtooth wave for scanning the cathode ray beam only during the period when observation is desired. In this arrangement wave impulses $F_0$ are applied over line 20 to the input of tube V14. These impulses are amplified in tube V15 and are passed over diode rectifier D2 and adjustable delay line L2 to the grid tube V11. A battery B2 is arranged with one terminal connected to ground and the other terminal connected over a resistance R2 to condenser C2. Charging of condenser C2 from battery B2 cannot take place until a ground is established for the other plate of condenser C2. The impulses applied to the grid of V11 render this tube conductive serving to produce a ground for condenser C2. Accordingly, while tube V11 is maintained in this conductive condition, condenser C2 will build up a charge. Time constant circuit C3, R3, is provided to maintain the positive charge on the grid of tube V11 for a predetermined fraction of the period of $F_0$. This time constant must be sufficiently large so that the positive charge is maintained for a period longer than the desired sawtooth element to be produced for scanning.

From the output of tube V14 energy is also passed through a delay line LA, tube V16 and tube V17. Delay line LA is adjusted to provide a delay equal to the desired fraction of the period of the input impulses $F_0$. The impulses at the output of tube V17 are negative and so upon application to the grid of tube V11 serve to block this tube and stop further charging of condenser C2. The time constant circuit C3, R3 tends to maintain this negative charge keeping the tube blocked until arrival of the next positive pulse from the output of rectifier D2. Accordingly, the voltage on the grid of tube V11 receives alternately positive and negative impulses as indicated in curve $2a$ of Fig. 2A. Because of the time constant circuit this is converted in the output of V11 into a resultant voltage curve as shown at $2b$ of this figure.

In order to produce the sawtooth wave form, as shown in $2c$ of Fig. 2A, it is necessary to discharge half the positive charging impulse. To effect this discharge I provide an oscillator V12. This oscillator is adjusted by suitable biasing means so it will not oscillate without a further additional control voltage. The additional control voltage is provided by passing an impulse from the output of tube V16 over a tube V13 to a coil 40 which is coupled with feedback coils 41 of the oscillator. This impulse, arriving at the time when condenser C2 is most highly charged, forces tube V12 into oscillation. The plate supply for tube V12 is provided by the negative charge built up on the cathode of the tube in condenser C2. V12 once having been started into oscillation continues to oscillate until condenser C2 has been discharged. In this manner the oscillator serves to discharge condenser C2 rapidly, producing the resultant output wave form shown at $2c$ of Fig. 2A.

Delay line LA may be made adjustable if desired to vary the length of the sawtooth sweep. Furthermore, delay means may be provided in the line between V14 and the grid of the tube V11 which may be also made adjustable with delay line LA so that initiation and termination of the sawtooth waves may be adjusted. Such an additional delay line is shown at L2, Fig. 2. By making both these delay lines adjustable the position of the fractional sawtooth sweep may be varied to any desired point along the time axis of input wave $F_0$.

In addition to the scanning control arrangement described above, further means may be provided to produce an indicating scale on the screen of cathode ray tube CR. One such system is schematically illustrated in Fig. 3. In this arrangement receiver 32 is connected in a manner similar to that shown shown in Fig. 1 and is arranged to apply deflecting potentials to the vertical deflector plates. At the same time the sweep voltage may be controlled by signals incoming over lines 20 and 21 by a sawtooth generator 50 and the cathode beam control 51 similar to those described in the foregoing Figure 1. It should be understood, however, that if desired the scanning may be controlled by other means such as the circuit arrangement shown in Fig. 2.

The scale calibrating for the tube CR is provided by means of pulses of frequency F obtained from line 21 and applied to a first frequency multiplier 52. The output of the frequency multiplier may be forked, one part of it going through impulse generator 53 which is connected directly to the vertical deflecting plates of tube CR. This impulse generator 53 may produce pulse indications of a desired amplitude, as shown at P. The other fork from the output of multiplier 52 is applied to a further frequency multiplier 54 and from this multiplier energy pulse signals are produced in pulse generator 55. These pulses are produced at a harmonic frequency with respect to the pulses generated in 53. Upon application of these frequency multiplied pulses to the vertical deflecting electrodes of tube CR other smaller divisions of the scale may be produced, as indicated at PI. By properly coordinating the spacing of these calibrating impulses generated by 53 and 55 with the distance to be measured a direct indication of the distance indicated by any received impulse may be directly read from the cathode ray screen.

In Fig. 4 is illustrated a still further embodiment of my invention for producing fractional scale deviations on a cathode ray oscillograph CR. The operation of this system will be explained together with the curves shown in Figs. 5, 6 and 7. Incoming impulses $F_0$ are applied to the receiver calibrator circuit 60 in the same manner shown in Fig. 3. These impulses are also applied to a frequency tripler 61 which serves to drive a scanning generator 62 producing a sawtooth scanning wave of the form shown at C, Fig. 5. The periodicity of these sawtooth waves is a multiple of the periodicity of waves $F_0$, for example, the third multiple as shown. The pulses $F_0$ are also applied to sawtooth generator 75 producing sawtooth waves of period T, shown at the curve a, Fig. 5. These sawtooth waves are then applied to a voltage limiter 65 which serves to cut off the top and bottom thirds of the sawtooth oscillation leaving a resultant curve, such as shown at curve b, Fig. 5. This output voltage is then applied to the grid of electron tube 66 from whence it is applied in the same phase to terminal 69 and in opposite phase to terminal 68. Thus, the voltage at terminal 68 will have the form shown in Fig. 7.

Sawtooth waves from the output of 75 are also applied to a second voltage limiter circuit 71 designed to pass only the top and bottom thirds of the sawtooth wave thereby producing the wave forms shown at curves a and b, Fig. 6. The energy of wave form a is passed directly to a mixer 72, while the energy of wave form b is applied to an inverter circuit 73 producing a resultant output voltage of curve c, Fig. 6, which is applied to mixer 72. The summation of the voltages of curves a and c of Fig. 6, produces an output wave as shown at curve d, Fig. 6 which is conducted to terminal 70.

Since the scanning waves applied to cathode ray tube CR are of three times the frequency of the normal pulse period T, it is clear that these three waves would be superposed on the screen of the cathode ray tube if they were all permitted to pass. However, the circuit arrangement of Fig. 4 is designed to permit selective indication of any one of these three indications on the tube to the exclusion of the other two. A control grid 76 in cathode ray tube CR is provided and is connected to an adjustable switch element 67. When this switch element 67 is positioned on terminal 69, grid 76 will be blocked for all but the first third of the period so that only the first sawtooth oscillation is effective. This can be readily ascertained by reference to curve b of Fig. 5. At the center position 70 only the middle third oscillation is permitted to pass, as will be readily apparent by reference to the control voltage curve d of Fig. 6, while in the third position 68, only the last third wave will be effective, as is evidenced by the control voltage curve of Fig. 7. Accordingly, it is clear that with this arrangement a selected fractional portion of the period may be covered by the sweep voltage of the cathode ray tube.

While I have described my invention with reference to particular embodiments and modifications thereof, it is not my intention that these embodiments serve as limitations on the scope of my invention. The scope of my invention may be readily determined by reference to the stated objects thereof and the appended claims.

What I claim is:

1. A cathode ray indicator comprising a cathode ray generator and a cooperating screen, means for deflecting the ray in one direction in response to spaced impulses occurring periodically, means to produce impulses at a period which is a multiple of the period of said spaced impulses, means to produce saw tooth waves at the period of said multiple impulses, means for causing said saw tooth waves to deflect the ray in another direction, means to derive impulses from said first mentioned spaced impulses which are of an opposite polarity from said multiple impulses but are of the same magnitude, means to combine said multiple impulses with said derived impulses, means to adjust the phase of said derived impulses so that any one series of said multiple impulses corresponding in time with said derived impulses will be canceled out by said derived impulses, and means to cause the remaining of said multiple impulses to suppress the ray during the period of time including the first and last impulse of any group of said multiple impulses whereby said ray will be moved across said screen in a predetermined fraction of the period of the first mentioned spaced impulses.

2. A cathode ray indicator according to claim 1 further comprising means for so adjusting the limits of the predetermined fraction as to reproduce a desired portion of said period.

3. A cathode ray indicator comprising a cathode ray generator and a cooperating screen, means for deflecting the ray in one direction in response to spaced impulses occurring periodically, timing means synchronized with said first means for deflecting the ray in another direction coordinated with the first direction across said screen during a predetermined fraction of the period of said impulses, and means for suppressing the ray during the portion of the said period which is non-coincident with said predetermined fraction, said last mentioned means comprising a first vacuum tube, means for applying control voltage impulses at said predetermined period of repetition to said first vacuum tube, a storage means coupled to said first vacuum tube, a second vacuum tube, a delay network having a delay period equal to said fraction of said predetermined period for applying said control voltages to said second vacuum tube, connections between said second vacuum tube and said storage means for removing potentials stored therein by said first vacuum tube, and means responsive to potentials in said storage means for suppressing said ray in response to impulses applied to said first vacuum tube and for rendering said ray effective by impulses applied to said second vacuum tube.

4. A cathode ray indicator comprising a cathode ray generator and a cooperating screen, means for deflecting the ray in one direction in response to spaced impulses occurring periodically, timing means synchronized with said first means for deflecting the ray in another direction coordinated with the first direction across said screen during a predetermined fraction of the period of said impulses, and means for suppressing the ray during the portion of said period which is non-coincident with said predetermined fraction, said means comprising a saw tooth generator operating at said predetermined period, voltage limiting means for selecting a predetermined portion of the saw tooth wave produced by said generator, and means for suppressing said cathode ray during the portions of said period corresponding to said predetermined portion of the saw tooth wave.

5. The combination with a cathode ray indicator having a cathode ray generator, a cooperating screen, a control grid, and ray deflecting means, of a source of control pulses recurring at a given frequency, means energizing said ray deflecting means to periodically sweep said ray across said screen a given plurality of sweeps for each of said control pulses, means applying a voltage to said control grid to suppress said ray and including means controlled by said control pulses for rendering said ray effective for only one sweep for each control pulse.

6. A combination according to claim 5 and including adjustable means for selecting the particular sweep of said plurality of sweeps in which said ray is rendered effective.

7. A cathode ray indicator comprising a cathode ray tube, means for producing a cathode ray in said tube, first and second deflecting means for deflecting said ray respectively in two directions, a receiving means for receiving impulses having a predetermined period of repetition, means for applying said received impulses to said first deflecting means, a source of saw-tooth waves having a periodicity which is a multiple of the periodicity of said received impulses, means for applying said saw-tooth waves to said second deflecting means, and means for suppressing said cathode ray during the time that all but one of said saw-tooth waves are applied to said second deflecting means in each period of repetition of said received impulses.

8. A cathode ray indicator comprising a cathode ray tube, means for producing a cathode ray in said tube, first and second deflecting means for deflecting said ray respectively in two directions, a receiving means for receiving impulses having a predetermined period of repetition, means for applying said received impulses to said first deflecting means, a source of impulses of the same periodicity as said received impulses, means including a frequency multiplier for deriving from said source of impulses a saw-tooth wave having a duration which is a sub-multiple of the period of repetition of said received impulses, and means for applying said saw-tooth wave to the said second deflecting means synchronously with the application of said received impulses to said first deflecting means.

HENRI G. BUSIGNIES.

REFERENCES CITED

The following references are of record in the file of this patent:

UNITED STATES PATENTS

| Number | Name | Date |
|---|---|---|
| 2,059,004 | Leeds | Oct. 27, 1936 |
| 2,088,495 | Swedlund | July 27, 1937 |
| 2,121,359 | Luck et al. | June 21, 1938 |
| 2,178,074 | Jakel et al. | Oct. 31, 1939 |
| 2,208,378 | Luck | July 16, 1940 |
| 2,223,830 | Norton | Mar. 11, 1941 |
| 2,244,513 | Burton | June 3, 1941 |
| 2,300,189 | Wolf | Oct. 27, 1942 |
| 2,347,008 | Vance | Apr. 18, 1944 |
| 2,368,448 | Cook | Jan. 30, 1945 |
| 2,368,449 | Cook | Jan. 30, 1945 |
| 2,375,709 | Thompson | May 8, 1945 |
| 2,399,955 | Theisen | May 7, 1946 |
| 2,402,168 | Lifschutz | June 18, 1946 |